United States Patent [19]

Bol et al.

[11] B 3,918,151

[45] Nov. 11, 1975

[54] METHOD OF MANUFACTURING A MULTIPLE MAGNETIC HEAD

[75] Inventors: Arie Bol; Johannes van Ginkel; Andrianus Henricus Maria Van Der Schoot; Petrus Henricus Swaanen, all of Eindhoven, Netherlands

[73] Assignee: U.S. Philips Corporation, New York, N.Y.

[22] Filed: Aug. 13, 1973

[21] Appl. No.: 387,687

[44] Published under the Trial Voluntary Protest Program on January 28, 1975 as document no. B 387,687.

Related U.S. Application Data

[62] Division of Ser. No. 234,713, March 15, 1972, Pat. No. 3,768,154.

[52] U.S. Cl. .................................. 29/603; 360/124

[51] Int. Cl.² .......................................... G11B 5/42

[58] Field of Search ............... 29/603; 340/174.1 F; 179/100.2 C; 346/74 MC; 360/123–127

[56] References Cited

UNITED STATES PATENTS

| | | | |
|---|---|---|---|
| 3,402,463 | 9/1968 | Bos et al. | 29/603 |
| 3,543,396 | 12/1970 | Illy et al. | 29/603 |
| 3,562,442 | 2/1971 | Pear, Jr. | 29/603 X |
| 3,593,414 | 7/1971 | Beun et al. | 29/603 |
| 3,668,775 | 6/1972 | Morita et al. | 29/603 |

*Primary Examiner*—C. W. Lanham
*Assistant Examiner*—Carl E. Hall
*Attorney, Agent, or Firm*—Frank R. Trifari

[57] ABSTRACT

A method of providing screening plates in multiple magnetic heads. Upon manufacturing multiple magnetic heads composed of two or more mouldings of ferrite cemented together, in which the screening plates are cemented in sawcuts arranged in said mouldings, the screening plates are arranged at an angle with the axis of their cut so as to prevent engagement on one side of a screening plate against a wall of its cut.

1 Claim, 9 Drawing Figures

METHOD OF MANUFACTURING A MULTIPLE MAGNETIC HEAD

This is a division, of application Ser. No. 234,713, filed Mar. 15, 1972 now U.S. Pat. No. 3,768,154.

The invention relates to a method of manufacturing a multiple magnetic head for magnetic data recording, which head comprises at least two cores of a magnetisable material each constituting a substantially closed path for magnetic flux, each time two of such cores being separated from each other by a spacing and screening member, the method comprising a first operational step in which at least two mouldings of a magnetisable material having accurately machined surfaces are placed against each other and combined to form one assembly by means of a cement, from which in a later stage of manufacture two or more mutually cohering cores can be manufactured, and comprising a second operational step in which a cut is provided in at least one of the mouldings in that (those) place(s) where a spacing and screening member, is to be provided, and comprising a third operational step in which a spacing and screening member, is cemented in each cut thus obtained by means of an adhesive drawn in by capillary forces.

Such a method is known both for manufacturing a multichannel magnetic head, i.e., a magnetic head having a number of cores which are arranged transverse to the direction of movement of a record carrier to be past along the head, and for manufacturing a multigraph magnetic head, i.e., a magnetic head having a number of cores which are arranged in the direction of movement of a record carrier to be guided past the head.

In this known method a few alternative methods are to be distinguished.

According to a first method, the sawcuts for cementing the screening member are arranged in that side of the assembly of mouldings which is situated opposite to the side constituting the operative face in the ultimate head. Upon machining the assembly of mouldings, the side of the operative face is ground down to in the screening members cemented in the cuts so as to magnetically separate the respective cores. For a two-channel-head in which start is made from two mouldings, this method is described in Philips research Report, vol. 15, 1960, pp. 362–65. For a double-gap-head in which start is made from three mouldings, said method is described in British Patent Specification No. 1,147,944.

According to a second method, the cuts in the assembly of mouldings are provided in the side of the operative face and the respective cores are separated magnetically in a later stage of the machining by means of sawing and/or grinding operations on the side of the assembly remote from the operative face. For a multichannel head, said method is described in British Patent Specification No. 1,086,233. It is to be noted that in the lastmentioned Patent Specification it is described in addition how the adhesive material for the mouldings (in that case glass) and the adhesive material for the intermediate members (likewise glass) is made to flow into the narrow seams formed between the various parts during the same heating step under the influence of capillary forces.

According to a third method, during the manufacture of a multichannel double-gap head a first set of cuts is provided in the lower side of an assembly of three mouldings cemented together and a second set of wider sawcuts extending to just in the central moulding is made in one of the side faces throughout the height along the axes of the sawcuts already made.

The three above-described methods have in common that upon manufacturing a multiple magnetic head, the assembly of mouldings is either held together during the various machining stages by a so-called engineering excess which is ground away later-on, or by the central moulding in an assembly of three, as a result of which a great accuracy in sizes can be obtained.

In all three cases it presents great advantages to cement the intermediate members into the cuts by means of an adhesive drawn in by capillary forces as described in particular in the above-mentioned British Patent Specification No. 1,086,233.

It has been found, however, that certain difficulties may present themselves in heads manufactured in such manner and on which the requirement is imposed that the cores to be screened from each other must be situated at a small distance apart so that with a given fixed thickness of the intermediate members the thickness of the adhering seams must be chosen to be very small (for example in the order of 10 to 20 microns). These difficulties are usually due to a mechanically weak construction of the head and to an accelerated erosion of the tape contact face.

It is the object of the invention to solve these difficulties and the invention is based on the recognition of the fact that on the one hand, during the production process the screening members to be cemented may unilaterally engage a wall of the cut by accidental circumstances as a result of which very narrow cementing seams are formed and that on the other hand it is just in narrow seams that, when the cement flows in, gas inclusions occur which do not only hamper a good wetting of the adhering surfaces but also manifest themselves in the tape contact face of the finished head as holes, which in operation may result in accelerated erosion of the tape contact face of the head. The term "unilaterally engaging" is to be understood to include mainly three cases. A screening member may engage its cut at such an oblique angle that its upper side bears against one wall of the cut and its lower side against the other; or an intermediate member may engage one wall of the cut entirely upright, or an intermediate member is much closer to one wall of the cut than to the other.

A first method according to the invention is characterized in that, in order to prevent unilateral engagement of a spacing and screening member against a wall of its cut, respectively to remove the drawbacks thereof, each spacing and screening member is provided, prior to its provision in its cut, on either side with a pattern of grooves and is inserted into its cut in such manner that the grooves extend in the direction in which the adhesive is to be drawn in.

Particularly when the depth of the grooves is at least as large as the thickness of the thinnest acceptable adhering layer, a good adhesion is obtained even in the case in which a screening member practically entirely engages the wall of its cut. The profile of the grooves should preferably be chosen to be so that the contact surface of the spacing and screening member with the wall of the cut is minimum.

In those cases in which the screening members are rather not machined, the object of the invention can be achieved by intentionally placing the screening members diagonally but upright in the cuts. Although the adhering seams extend obliquely then, unilateral engagement of the screening members is prevented so that there is sufficient space for the adhesive to flow in.

A second method according to the invention is therefore characterized in that each spacing and screening member, is placed at an angle with the axis of the cut in which it is inserted.

The screening members preferably extend laterally beyond the sawcuts as a result of which the inclination is extraordinarily facilitated. With one motion of the hand, even a great number of screening members already placed in the sawcuts can be simultaneously set in the desirable position by wiping along the projecting parts in one direction.

With certain types of magnetic heads, however, it may be desirable for the screening members to be cemented as much as possible centrally in the sawcuts as a result of which the above-mentioned solutions are not possible in these cases.

A third method according to the invention is characterized in that each spacing and screening member is provided on either side with at least one cam or each cut is provided with a local narrowing, so as to be able to position the relative member as much as possible centrally in its cut.

In order that the invention may be readily carried into effect, a number of embodiments thereof will now be described in greater detail, by way of example, with reference to the accompanying drawing, in which.

Figures 1, 2:
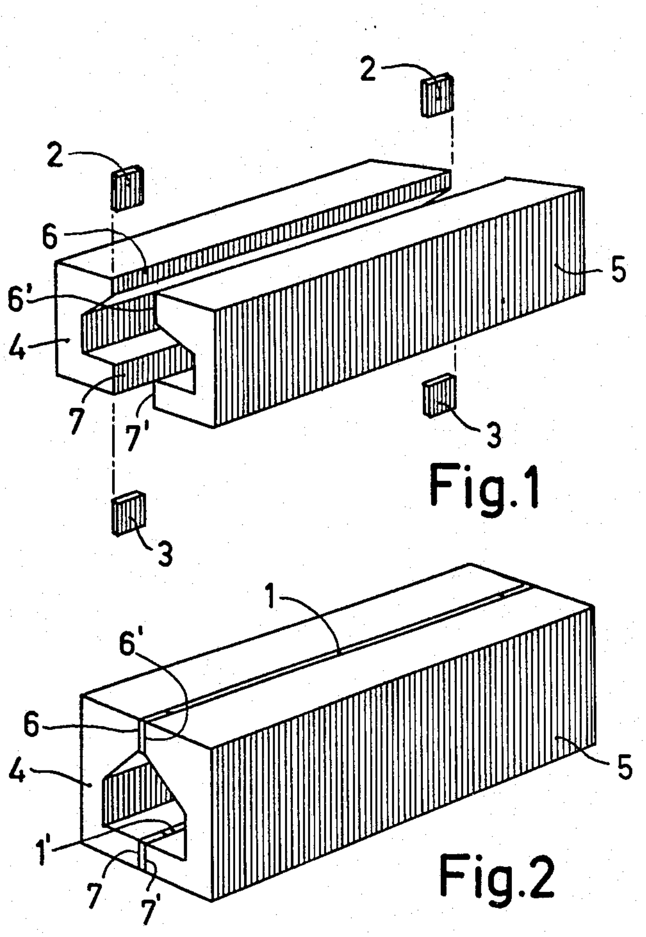
FIG. 1 is a perspective view of two mouldings of ferrite having a given cross-section and having their polished surfaces facing each other.
FIG. 2 is a perspective view of the two mouldings of FIG. 1 which are cemented together at their polished surfaces by means of a cement.

FIG. 1 shows a pair of mouldings of ferrite 4, 5. They are provided with polished surfaces 6, 7 and 6', 7'. After the interposition of spacing members 2, 2' and 3, 3', the mouldings 4 and 5 are placed against each other with their polished surfaces 6, 7 and 6', 7'.

FIG. 2 shows the assembly of mouldings 4, 5 after they have been cemented together, for example, by means of glass which is drawn-in by capillary action in the spaces 1, 1' between the polished surfaces 6 and 6' and 7 and 7'.

Figure 3:
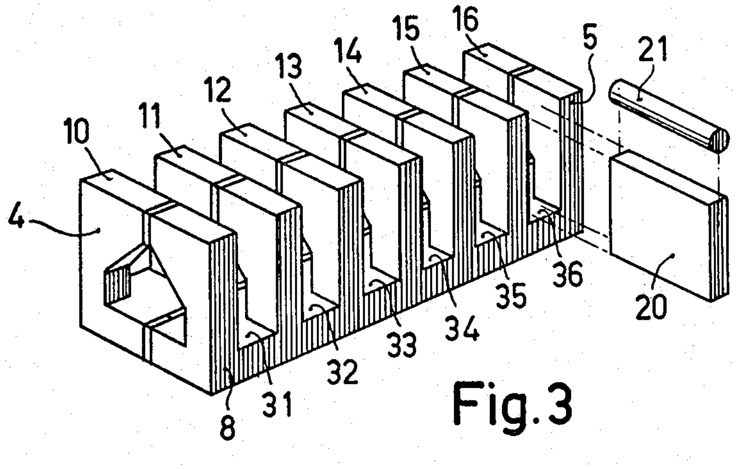
FIG. 3 is a perspective view of the two mouldings shown in FIG. 2 which are cemented together and which are provided with a number of saw cuts transverse to the adhering surfaces.

As shown in FIG. 3, a number of sawcuts 31, 32, . . . 36, is provided in the assembly at right angles to the adhering surfaces 6, 6' and 7, 7' so that a number of pole piece plates for magnetic heads 10, 11, . . . 16 is obtained. These sawcuts 31, 32, . . . 36 in the case shown have the same mutual distance and equal width and height. It is to be noted that in this stage of the manufacture the various pole piece plates 10, 11, . . . 16 are held together by the technological extra 8.

Figure 4:
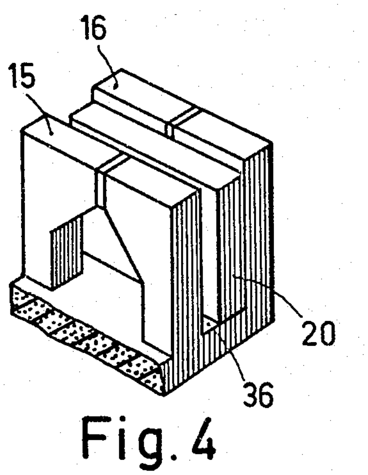
FIGS. 4 and 5 show two examples of unilateral engagement of a screening plate in its sawcut.
Figure 5:
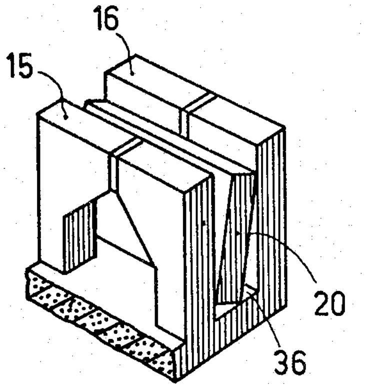

In the sawcuts 31 . . . 36, screening and spacing plates 20 and so on must be placed and cemented. This latter may be done, for example, by laying glass fibres 21 and so on on top of the screening and spacing plates which have a height which is slightly smaller than the depth of the sawcuts and then heating the assembly in a furnace to the flow temperature of the glass used for the fibres as a result of which the glass is drawn-in by capillary action between the walls of the sawcuts and the screening and spacing plates placed therein. The danger exists, however, that during the provision a plate unilaterally engages the wall of its sawcut as a result of which the cement cannot readily wet the faces to be sealed on that side. This situation is shown in FIG. 4 in which the plate 20 entirely engages the pole piece plate 16 upright, and in FIG. 5 in which the plate 20 engages the pole piece plate 16 with its upper side and engages the pole piece plate 15 with its lower side. A good flow of the cement is not possible in both cases.

Figure 6:
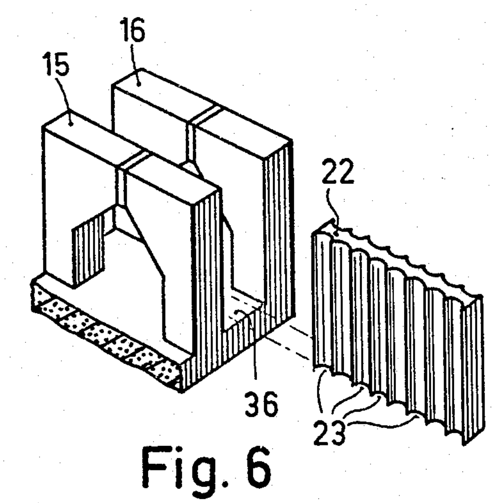
FIGS. 6, 7, 8 and 9 show 4 embodiments of manners in which, according to the invention, a unilateral engagement of a screening plate in its sawcut and the drawbacks thereof, respectively, can be prevented.

A good flow is possible irrespective of the location of the plate in its sawcut if, as shown in FIG. 6, the plate 22 is provided with a pattern of grooves 23, which extends in the direction in which the cement flows-in. The profile of the grooves should be chosen to be so that the contact surface of the plate with the wall of the sawcut 32 is minimum.

Also without mechanically working the plate as in the preceding case, a good flow of the cement can be ensured.

Figure 7:
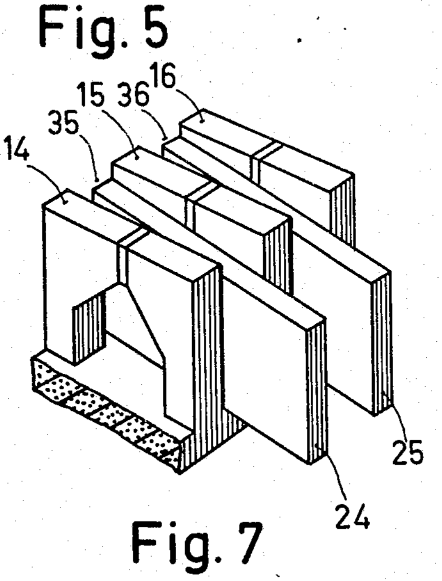

As shown in FIG. 7, the plates 24, 25 are intentionally placed diagonally but upright in their sawcuts 35, 36. In this case the cement can sufficiently flow on either side of the plates. The plates 24, 25 should preferably project from the sawcuts 35, 36 so that the desirable inclination can be realized simultaneously for all plates by one movement of the hand.

Figure 8:
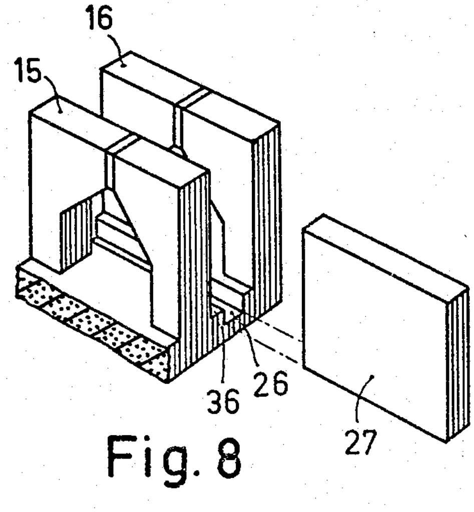
Figure 9:
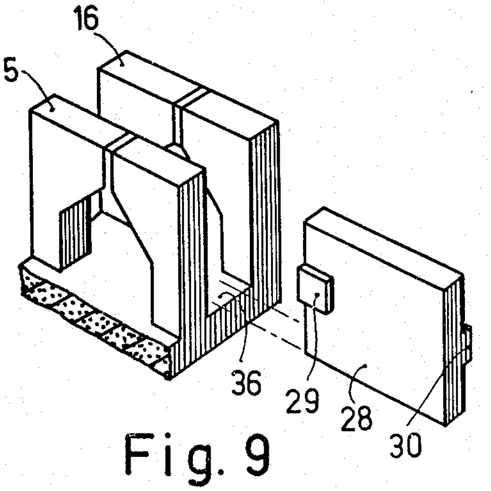

FIGS. 8 and 9 show methods to ensure that a plate is positioned exactly centrally in its sawcut. FIG. 8 shows that the sawcut 36 is provided in its centre with a deeper narrowing 26 in which the plate 27 fits accurately. FIG. 9 shows that the plate 28 is provided on one side with a cam 29 and on the other side with a cam 30 as a result of which the desirable position of the plate 28 in the sawcut 36 can also be ensured.

What is claimed is:

1. A method of manufacturing a multiple magnetic head for magnetic data recording having at least two cores of a magnetizable material, each constituting a substantially closed path for magnetic flux, said cores being separated from each other by a spacing and screening member, the method comprising the steps of:

A. placing at least two mouldings of a magnetizable material, having machined surfaces thereon, adjacent each other with their machined surfaces facing each other;
B. cementing said mouldings to form an assembly;
C. laterally cutting through the assembly to provide at least one lateral cut space for a spacing and screening member;
D. placing a screening and spacing member in the provided space of step (C) at an angle to said lateral cut space so as to prevent unilateral engagement of said screening and spacing member against a wall of said space, thereby providing cementing spaces on both sides of said screening and spacing member, and
E. cementing said spacing and screening member in said lateral cut space by drawing adhesive into said cementing spaces by capillary action.

* * * * *

UNITED STATES PATENT AND TRADEMARK OFFICE

CERTIFICATE OF CORRECTION

PATENT NO. : 3,918,151

DATED : November 11, 1975

INVENTOR(S) : ARIE BOL ET AL

It is certified that error appears in the above-identified patent and that said Letters Patent are hereby corrected as shown below:

IN THE TITLE PAGE

Section [75] change "ANDRIANUS HENRICUS MARIA VAN DER SCHOOT" to

--ADRIANUS HENRICUS MARIA VAN DER SCHOOT--

Insert the following where appropriate:

--[30] FOREIGN APPLICATION PRIORITY DATA

March 17, 1971 Netherlands....7103549--

Signed and Sealed this

*sixth* Day of *April 1976*

[SEAL]

*Attest:*

RUTH C. MASON
*Attesting Officer*

C. MARSHALL DANN
*Commissioner of Patents and Trademarks*